United States Patent
Henderson (10) Patent No.: US 9,340,300 B2
(45) Date of Patent: May 17, 2016

(54) ON-GROUND BRAKING ALERTS FOR AIRPLANES

(71) Applicant: The Boeing Company, Chicago, IL (US)

(72) Inventor: Mark H. Henderson, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/027,723

(22) Filed: Sep. 16, 2013

(65) Prior Publication Data

US 2015/0081142 A1    Mar. 19, 2015

(51) Int. Cl.

| | |
|---|---|
| G01C 23/00 | (2006.01) |
| G05G 5/06 | (2006.01) |
| B64D 45/04 | (2006.01) |
| G08G 5/06 | (2006.01) |
| B64C 25/42 | (2006.01) |
| G05D 1/06 | (2006.01) |
| G05D 1/00 | (2006.01) |

(52) U.S. Cl.
CPC ............... *B64D 45/04* (2013.01); *G01C 23/00* (2013.01); *G05D 1/0083* (2013.01); *G05D 1/0676* (2013.01); *G08G 5/06* (2013.01); *B64C 25/426* (2013.01)

(58) Field of Classification Search
CPC ... B64D 45/04; G05D 1/0676; G05D 1/0083; G08G 5/06; G01C 23/00; B64C 25/426
See application file for complete search history.

(56) References Cited

U.S. PATENT DOCUMENTS

| | | | |
|---|---|---|---|
| 3,920,204 A | | 11/1975 | Bissell et al. |
| 4,316,252 A | * | 2/1982 | Cooper ........................... 701/16 |
| 5,968,106 A | * | 10/1999 | DeVlieg et al. .................. 701/70 |
| 6,991,304 B2 | * | 1/2006 | Villaume ...................... 303/126 |
| 7,117,089 B2 | | 10/2006 | Khatwa et al. |
| 7,586,422 B2 | | 9/2009 | Goodman et al. |
| 7,587,278 B2 | | 9/2009 | Poe et al. |
| 7,626,513 B2 | | 12/2009 | Goodman et al. |
| 7,797,095 B2 | | 9/2010 | Rado |
| 7,908,078 B2 | | 3/2011 | He |
| 8,060,261 B2 | | 11/2011 | Goodman et al. |
| 8,126,600 B2 | | 2/2012 | Conner et al. |

(Continued)

FOREIGN PATENT DOCUMENTS

EP    2148260 A1    1/2010

OTHER PUBLICATIONS

International Search Report and Written Opinion, International Application No. PCT/US2014/042582 (foreign counterpart to the instant application), mailed on Sep. 29, 2014.

*Primary Examiner* — Rami Khatib
*Assistant Examiner* — Jeffrey Boomer
(74) *Attorney, Agent, or Firm* — Ostrager Chong Flaherty & Broitman P.C.

(57) ABSTRACT

Systems and methods for reducing the number of runway excursions (i.e., airplanes going off the end of a runway). An alerting system is provided which alerts pilots when computer calculations indicate that current airplane braking is insufficient to keep the airplane from going off the end of the runway. The current airplane braking during rollout is evaluated using algorithms which take into account the current groundspeed of the airplane, the current deceleration rate or the maximum manual deceleration rate of the airplane, and the distance from the current position of the airplane to the end of the runway.

8 Claims, 4 Drawing Sheets

(56) References Cited

U.S. PATENT DOCUMENTS

| | | |
|---|---|---|
| 2001/0052562 A1 | 12/2001 | Ishihara et al. |
| 2004/0167685 A1 | 8/2004 | Ryan et al. |
| 2008/0012729 A1* | 1/2008 | Constans ................. 340/973 |
| 2008/0154445 A1* | 6/2008 | Goodman et al. ............. 701/3 |
| 2009/0048724 A1* | 2/2009 | Caule ................. B64C 25/426 |
| | | 701/16 |
| 2010/0029005 A1* | 2/2010 | Kamiie et al. ................ 436/86 |
| 2010/0070115 A1 | 3/2010 | Villaume |
| 2010/0079308 A1* | 4/2010 | Fabre et al. ................. 340/951 |
| 2011/0166723 A1* | 7/2011 | Valentova et al. ............. 701/16 |
| 2013/0197727 A1* | 8/2013 | Muller et al. .................. 701/16 |
| 2013/0261855 A1* | 10/2013 | DeGagne et al. .............. 701/16 |
| 2013/0261920 A1* | 10/2013 | Picaut et al. ................... 701/70 |
| 2013/0325245 A1* | 12/2013 | Kolcarek et al. ............. 701/29.1 |
| 2014/0148980 A1* | 5/2014 | Le Corre et al. ............... 701/16 |
| 2014/0257601 A1* | 9/2014 | Horne et al. ................... 701/16 |
| 2014/0257603 A1* | 9/2014 | McKeown et al. ............. 701/16 |
| 2015/0302753 A1* | 10/2015 | Henderson ............... G08G 5/02 |
| | | 701/18 |

* cited by examiner

ON-GROUND BRAKING ALERTS FOR AIRPLANES

BACKGROUND

This disclosure generally relates to systems, methods for alerting pilots during landing when current airplane braking is not sufficient to avoid runway excursions.

There are existing methods and devices for alerting pilots of the risk of a runway excursion (i.e., the airplane going off the end of the runway) during landing. However, the existing methods and devices rely on pilot perception and interpretation of the alerts as well as various landing information and data, such as the airplane's current deceleration rate, runway conditions or remaining runway distance, to determine an appropriate corrective action, and then the pilot must take the corrective action in a timely manner.

For example, most runways include runway landmarks such as billboards that identify the distance remaining until the end of the runway. Such landmarks are used by pilots to estimate whether the airplane's performance on the ground (for example, its braking performance) is in-line with the planned performance and whether there remains a sufficient length of runway for the airplane to reduce its speed to enable the airplane to turn into an exit taxiway or stop. Runway landmarks also require that pilots be able to read the billboards in all conditions and then use that information to evaluate how the remaining distance relates to the airplane's braking performance. That determination must take into account the airplane's available deceleration tools, including autobrake settings (e.g., automated wheel-based braking), reversing the engine thrust (e.g., thrust reversers), and aerodynamic braking using wing flaps (e.g., spoilers or speedbrakes).

Other automated aircraft systems are available that provide visual and/or audible call-outs of various airplane performance characteristics for pilots, including remaining runway distance and runway conditions. Such systems are referred to in the aircraft industry generically as proximity warning systems or terrain awareness and warning systems (TAWS), and generally aim to prevent terrain accidents during controlled landings. A TAWS may comprise: (1) a computer system (as defined in the penultimate paragraph of the Detailed Description hereinafter) that executes operations in accordance with an algorithm that uses aircraft inputs such as position, attitude and air speed, along with databases of terrain, obstacles and airport information (including runway information) to predict a potential conflict between the aircraft's flight path and an obstacle, and (2) alert devices for providing visual and aural alerts to pilots when flight into an obstacle is predicted by the computer system. The TAWS may include a software module, which uses GPS position data and databases to provide aural callouts and advisories that supplement flight crew awareness of the airplane's position during taxiing, takeoff, final approach, landing and rollout, including to help reduce the risk of a runway excursion by providing timely callouts as the aircraft approaches the end of the runway. For example, the TAWS runway module provides Distance Remaining callouts to inform pilots of remaining runway distance for information purposes. Whether a callout should be issued or not is determined by comparing the current aircraft position along the runway to the location of the end of the runway. The pilot interprets the information provided and then determines what corrective action to take.

Pilots estimate their performance on the ground using runway landmarks (like distance remaining billboards) with reference to what was planned. This would require that the pilots can read the billboards in all conditions (if there are billboards on the runway) and then assess how that relates to their braking performance. A TAWS runway module provides distance remaining callouts, but the pilot still needs to relate this with braking performance. A problem can arise when a pilot uses insufficient braking for current runway conditions and/or remaining runway distance.

SUMMARY

It would be advantageous to provide an improved warning system to alert pilots when they are using insufficient braking for current runway conditions and/or remaining runway distance. The subject matter disclosed in detail below is directed to systems and methods for reducing the number of runway excursions (i.e., airplanes going off the end of a runway). An alerting system is provided which alerts pilots when computer calculations indicate that current airplane braking is insufficient (or nearly insufficient) to keep the airplane from going off the end of the runway. The current airplane braking during rollout is evaluated using algorithms which take into account the current groundspeed of the airplane, the current deceleration rate or the maximum manual deceleration rate of the airplane, and the distance from the current position of the airplane to the end of the runway (i.e., the remaining runway distance). The current groundspeed and current deceleration rate are measured by an air data inertial reference unit (ADIRU); the current position of the airplane is measured using a global positioning system (GPS); the position of the end of the runway is retrieved from a runway information database.

One aspect of the subject matter disclosed herein is an onboard braking alerting system for an aircraft, comprising a computer system and an alert device operatively coupled to the computer system, the computer system being programmed to perform the following operations: (a) obtaining data representing the current position and the current and final groundspeed of an aircraft on a runway, a maximum manual deceleration rate of the aircraft, and the position of the end of the runway; (b) calculating a remaining runway distance from the current position of the aircraft to the end of the runway; (c) calculating a maximum manual deceleration distance that the aircraft would travel during maximum manual braking to the final groundspeed based on the current groundspeed and the maximum manual deceleration rate of the aircraft; (d) comparing the maximum manual deceleration distance to remaining runway distance; and (e) issuing an alert activation signal if the maximum manual deceleration distance is greater than the remaining runway distance. The alert device is capable of producing an alert (e.g., a visual or an aural alert) in response to issuance of the alert activation signal by the computer system. Operations (b) through (e) are performed during rollout of the aircraft.

Another aspect of the subject matter disclosed herein is an onboard braking alerting system for an aircraft, comprising a computer system and an alert device operatively coupled to the computer system, the computer system being programmed to perform the following operations: (a) obtaining data representing the current position and the current and final groundspeed of an aircraft on a runway, a maximum manual deceleration rate of the aircraft, and the position of the end of the runway; (b) calculating a remaining runway distance from the current position of the aircraft to the end of the runway; (c) calculating a maximum manual deceleration time based on the current and final groundspeed and the maximum manual deceleration rate; (d) calculating a distance that the aircraft would travel during a time period equal to the sum of the maximum manual deceleration time and a specified time interval based on the current groundspeed and the maximum manual deceleration rate of the aircraft; (e) comparing the distance calculated in operation (d) to the remaining runway distance; and (f) issuing an alert activation signal if the distance calculated in operation (d) is greater than the remaining runway distance. The alert device is capable of producing an alert (e.g., a visual or an aural alert) in response to issuance of the alert activation signal by the computer system. Operations (b) through (f) are performed during rollout of the aircraft.

A further aspect of the subject matter disclosed herein is an onboard braking alerting system for an aircraft, comprising a computer system and an alert device operatively coupled to the computer system, the computer system being programmed to perform the following operations: 9. An onboard braking alerting system for an aircraft, comprising a computer system and an alert device operatively coupled to the computer system, wherein the computer system is programmed to perform the following operations: (a) obtaining data representing the current position and the current and final groundspeed of an aircraft on a runway, and the position of the end of the runway; (b) setting a value for a planned deceleration rate of the aircraft; (c) calculating a remaining runway distance from the current position of the aircraft to the end of the runway; (d) calculating a distance that the aircraft would travel before reaching the final groundspeed based on the current groundspeed and the planned deceleration rate of the aircraft; (e) comparing the distance calculated in operation (d) to the remaining runway distance; and (f) issuing an alert activation signal if the distance calculated in operation (d) is greater than the remaining runway distance. The alert device is capable of producing an alert (e.g., a visual or an aural alert) in response to issuance of the alert activation signal by the computer system. Operations (b) through (f) are performed during rollout of the aircraft. Optionally, the computer system is further programmed to obtain data representing current runway conditions and thrust reverser usage, wherein the value of the planned deceleration rate set in operation (b) is a function of the data representing current runway conditions and thrust reverser usage. Optionally, the computer system is programmed to perform the following additional operations: obtaining data indicating that an autobrake onboard the aircraft has been set; obtaining data representing the current deceleration rate of the aircraft; and comparing the current deceleration rate to a plurality of ranges of deceleration rates in a table, each range being associated with a respective autobrake setting value and a respective state of runway conditions. In this implementation, the value of the planned deceleration rate set in operation (b) is a lowest value of the one of the ranges of deceleration rates that includes the current deceleration rate.

Yet another aspect is a method for monitoring braking during rollout of an aircraft, comprising: (a) obtaining data representing the current position and the current and final groundspeed of an aircraft on a runway, a maximum manual deceleration rate of the aircraft, and the position of the end of the runway; (b) calculating a remaining runway distance from the current position of the aircraft to the end of the runway; (c) calculating a maximum manual deceleration distance that the aircraft would travel during maximum manual braking to the final groundspeed based on the current groundspeed and the maximum manual deceleration rate of the aircraft; and (d) comparing the maximum manual deceleration distance to remaining runway distance. Operations (a) through (d) are performed by a computer system onboard the aircraft. If the maximum manual deceleration distance is greater than the remaining runway distance, an alert activation signal is issued; and an alert is produced in response to issuance of the alert activation signal.

A further aspect is a method for monitoring braking during rollout of an aircraft, comprising: (a) obtaining data representing the current position and the current and final groundspeed of an aircraft on a runway, a maximum manual deceleration rate of the aircraft, and the position of the end of the runway; (b) calculating a remaining runway distance from the current position of the aircraft to the end of the runway; (c) calculating a maximum manual deceleration time based on the current and final groundspeed and the maximum manual deceleration rate; (d) calculating a distance that the aircraft would travel during a time period equal to the sum of the maximum manual deceleration time and a specified time interval based on the current groundspeed and the maximum manual deceleration rate of the aircraft; and (e) comparing the distance calculated in operation (d) to the remaining runway distance. Operations (a) through (e) are performed by a computer system onboard the aircraft. If the distance calculated in operation (d) is greater than the remaining runway distance, an alert activation signal is issued; and an alert is produced in response to issuance of the alert activation signal.

Another aspect of the subject matter disclosed herein is a method for monitoring braking during rollout of an aircraft, comprising: (a) obtaining data representing the current position and the current and final groundspeed of an aircraft on a runway, and the position of the end of the runway; (b) setting a value for a planned deceleration rate of the aircraft; (c) calculating a remaining runway distance from the current position of the aircraft to the end of the runway; (d) calculating a distance that the aircraft would travel before reaching the final groundspeed based on the current groundspeed and the planned deceleration rate of the aircraft; and (e) comparing the distance calculated in operation (d) to the remaining runway distance. Operations (a) through (e) are performed by a computer system onboard the aircraft. If the distance calculated in operation (d) is greater than the remaining runway distance, an alert activation signal is issued; and an alert is produced in response to issuance of the alert activation signal.

In accordance with one option, the method described in the preceding paragraph further comprises obtaining data representing current runway conditions and thrust reverser usage, wherein the value of the planned deceleration rate set in operation (b) is a function of the data representing current runway conditions and thrust reverser usage. In accordance with another option, the method described in the preceding paragraph further comprises obtaining data indicating that an autobrake onboard the aircraft has been set; obtaining data representing the current deceleration rate of the aircraft; and comparing the current deceleration rate to a plurality of ranges of deceleration rates in a table, each range being associated with a respective autobrake setting value and a respective state of runway conditions. The value of the planned deceleration rate set in operation (b) is a lowest value of the one of the ranges of deceleration rates that includes the current deceleration rate.

Other aspects of systems and methods for alerting pilots when computer calculations indicate that current braking is insufficient (or nearly insufficient) to prevent a runway excursion are disclosed below.

BRIEF DESCRIPTION OF THE DRAWINGS

FIG. 2A shows operations defined by an algorithm for setting an initial planned deceleration rate. FIG. 2B shows operations defined by respective algorithms for checking alerts, inhibiting alerts and adjusting the value of planned deceleration rate.

Reference will hereinafter be made to the drawings in which similar elements in different drawings bear the same reference numerals.

DETAILED DESCRIPTION

An on-ground braking alerting system will be described with reference to an illustrative embodiment. An alerting system is provided which alerts pilots when current airplane braking is insufficient to keep the airplane from going off the end of the runway. In accordance with the disclosed embodiment, the on-ground braking alerting system may take the form of a software module comprising process instructions executed by an onboard computer system that calculates the runway distance remaining during rollout in real time. The current airplane braking is evaluated using algorithms which take into account the current groundspeed and deceleration rate of the airplane and the remaining runway distance.

Figure 1:
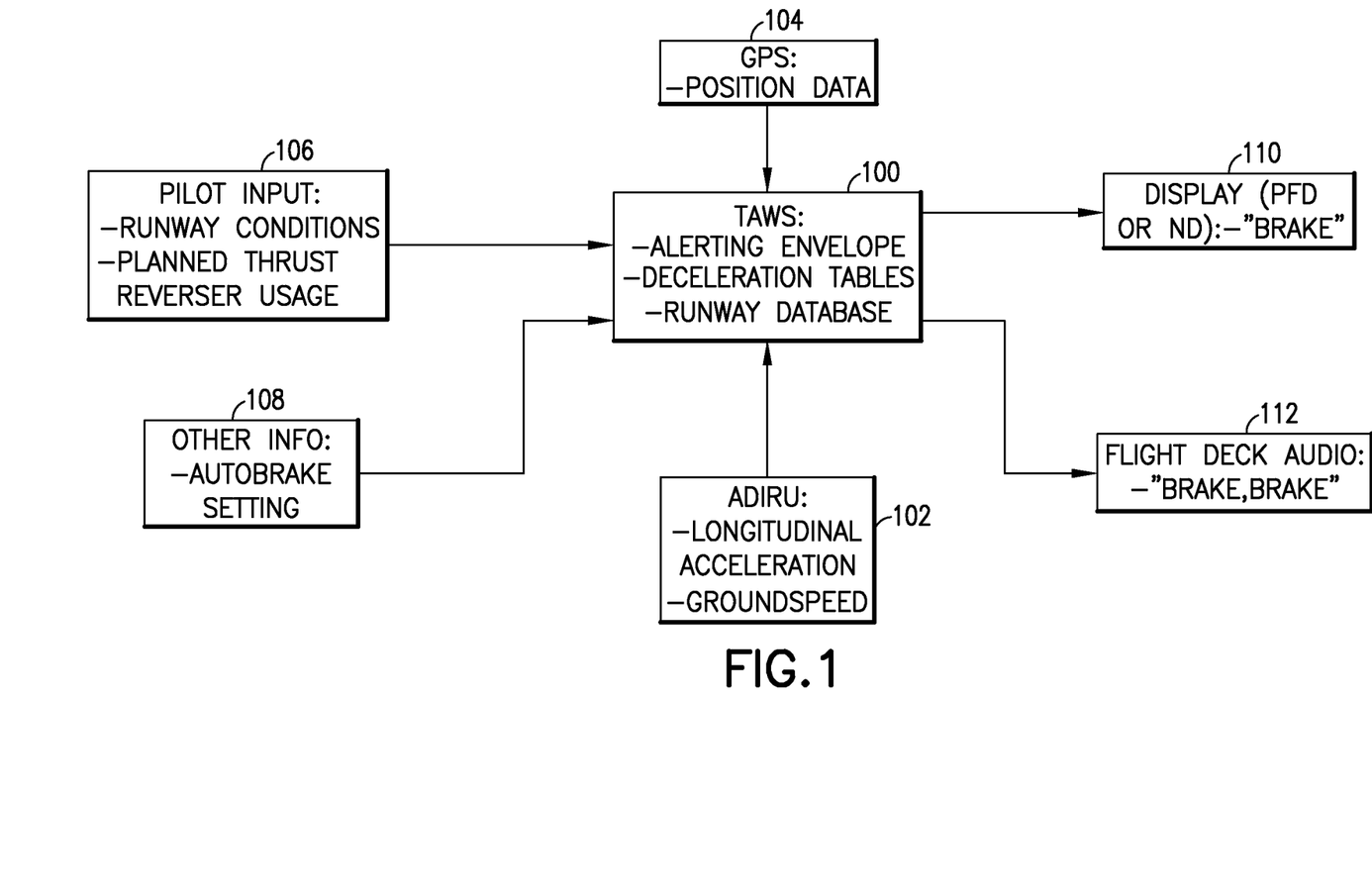
FIG. 1 is a block diagram showing inputs and outputs of a computer system for alerting a pilot when current braking during landing is insufficient to avoid a runway excursion in accordance with one embodiment.

FIG. 1 is a block diagram showing inputs and outputs of a computer system for alerting a pilot when current braking during landing is insufficient to avoid a runway excursion. In accordance with one embodiment, the computer system may take the form of a terrain awareness and warning system (TAWS) 100. The TAWS 100 is of a type having a software module of a type which is capable of calculating the remaining runway distance in real time during airplane rollout. For example, the remaining runway distance may be determined by comparing the current aircraft position along the runway to the location of the end of the runway. The current aircraft position along the runway can be determined from position received from a receiver of a global positioning system (GPS) 104; the location of the end of the runway is retrieved from a runway information database in the TAWS 100.

The TAWS 100 is programmed to evaluate the current airplane braking is using algorithms which take into account the current groundspeed and deceleration rate of the airplane supplied by an ADIRU 102 and the remaining runway distance from the TAWS 100. The air data reference component of an ADIRU provides airspeed, Mach number, angle of attack, temperature and barometric altitude data. The inertial reference component of an ADIRU gives attitude, flight path vector, groundspeed, longitudinal acceleration, and positional data.

In accordance with the on-ground braking alerting process disclosed in detail below, the TAWS 100 comprises a software module for monitoring on-ground braking during rollout and issuing an alert when the current braking produces a state of the aircraft that falls within an alerting envelope. For example, an alert can be triggered in response to detection of any one of a plurality of specified conditions that are indicative of a possible runway excursion.

The TAWS 100 receives (from the flight management system) values representing pilot inputs 106 into the master control display unit (MCDU). These pilot inputs 106 include a runway conditions setting and a thrust reverser usage setting. The runway conditions setting is selected based on a report of current runway conditions received by the pilot. Reverse thrust is typically applied immediately after touchdown, often along with speedbrakes, to improve deceleration early in the landing rollout when residual aerodynamic lift and high speed limit the effectiveness of the friction brakes located on the landing gear. Reverse thrust is selected manually by the pilot. The thrust reverser status is either deployed or not deployed.

The TAWS 100 also receives a value representing the autobrake setting 108 from a display bus. The selection of an autobrake setting is normally done on the aircraft instrument panel before landing. These are often numbered or labeled, with "1" or "LO" referring to braking for a light speed reduction, and subsequent numbers or designations up to "MAX" referring to more abrupt speed reductions. Full manual brakes application gives greater stopping efficiency than with autobrakes set at MAX. Therefore it is advantageous to alert the pilot of a possible runway excursion so that the pilot can take action, i.e., by manually applying additional braking force.

The autobrake setting is selected by the pilot with reference to runway performance tables which the pilot uses to determine the landing distance for the aircraft. The runway performance tables are charts with rows that identify the landing gear braking to be utilized (autobrake or manual) and columns that list different factors that pilots consider when determining the required runway length to stop the aircraft (aircraft weight, winds, airspeed at landing, etc.). There are also four different runway conditions (dry, good, medium, and poor) that have different runway lengths for each of the landing gear braking rows, which runway conditions the pilot also has to consider when calculating the runway distance. The runway conditions are an important factor in determining landing distance because if an aircraft lands with an autobrake setting of 2, with no winds, the runway distances between dry and good could be under 100 ft, dry and medium could be a few hundred feet, and dry and poor could differ over 1000 ft. Add wind conditions or not using the thrust reversers and the differences can vary even more.

Furthermore, the deceleration rates corresponding to the different brake settings with different runway conditions can be determined because the tables also give the runway length within which the aircraft can be stopped at the airspeed it is landing at. As indicated in FIG. 1, these deceleration rates are in a database on the TAWS 100. When the aircraft lands and the TAWS 100 receives an autobrake input 108 indicating which level has been selected, then the TAWS 100 can convert the deceleration rate (i.e., longitudinal acceleration) sensed by the ADIRU 102 into a value indicating what the runway conditions are by comparing the ADIRU deceleration rate to the values in the TAWS deceleration database.

In accordance with one implementation, the TAWS 100 is programmed to process the above-discussed inputs and issue one or more alerts when specified conditions of the alert envelope are satisfied. One alert is a visual alert displayed on a display unit 110 (e.g., a primary display unit or a navigation display unit). In one implementation, the visual alert may be the word "BRAKE" flashing in a contrasting color on the display unit. Another alert is an aural alert generated by the flight deck audio system 112. In one implementation, the aural alert may be an automated voice message in which the word "BRAKE" is rapidly repeated.

Figure 2A:
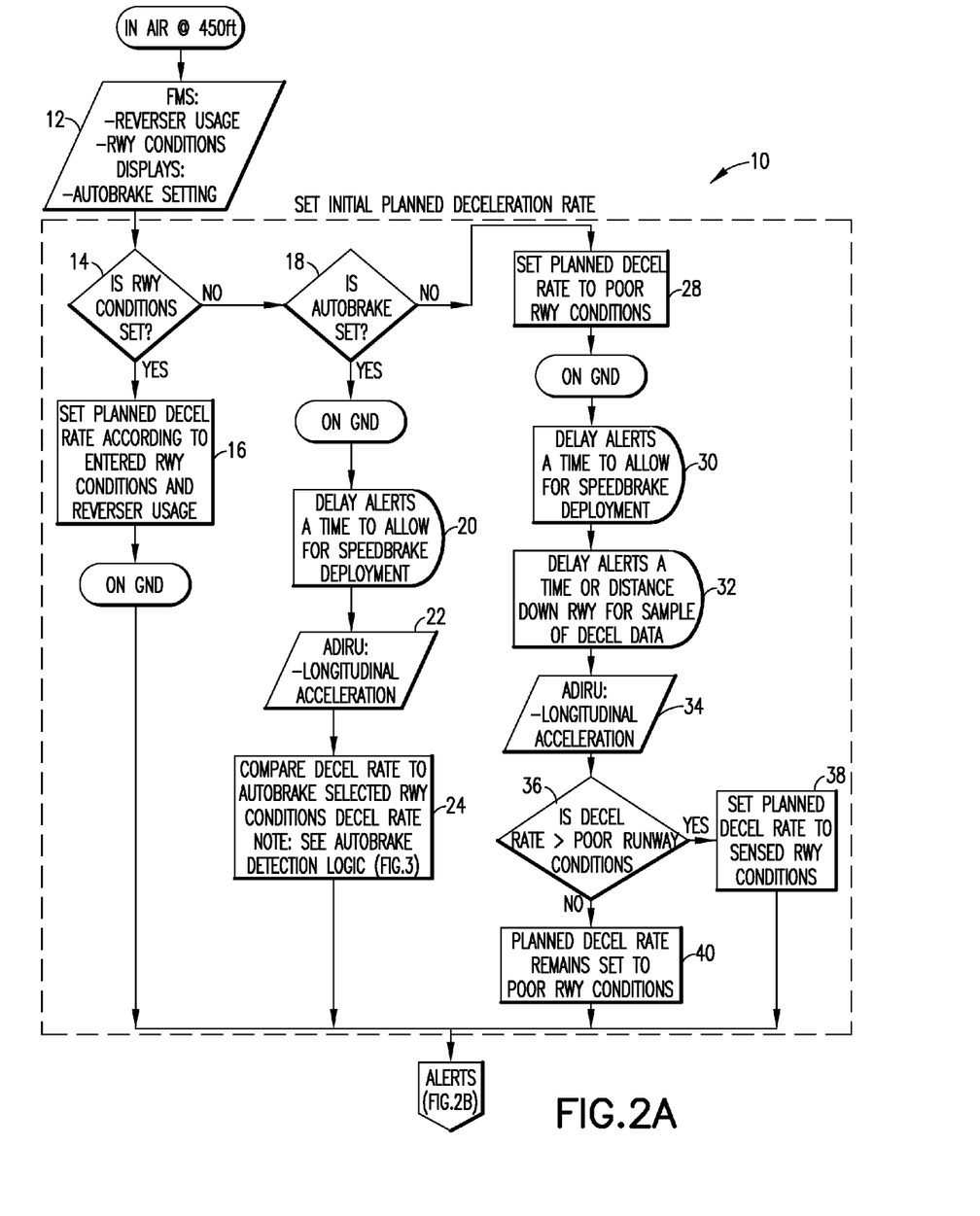
FIGS. 2A and 2B are flowcharts showing logic, executed by a computer system, for alerting a pilot when current braking during landing is insufficient to avoid a runway excursion.
Figure 2B:
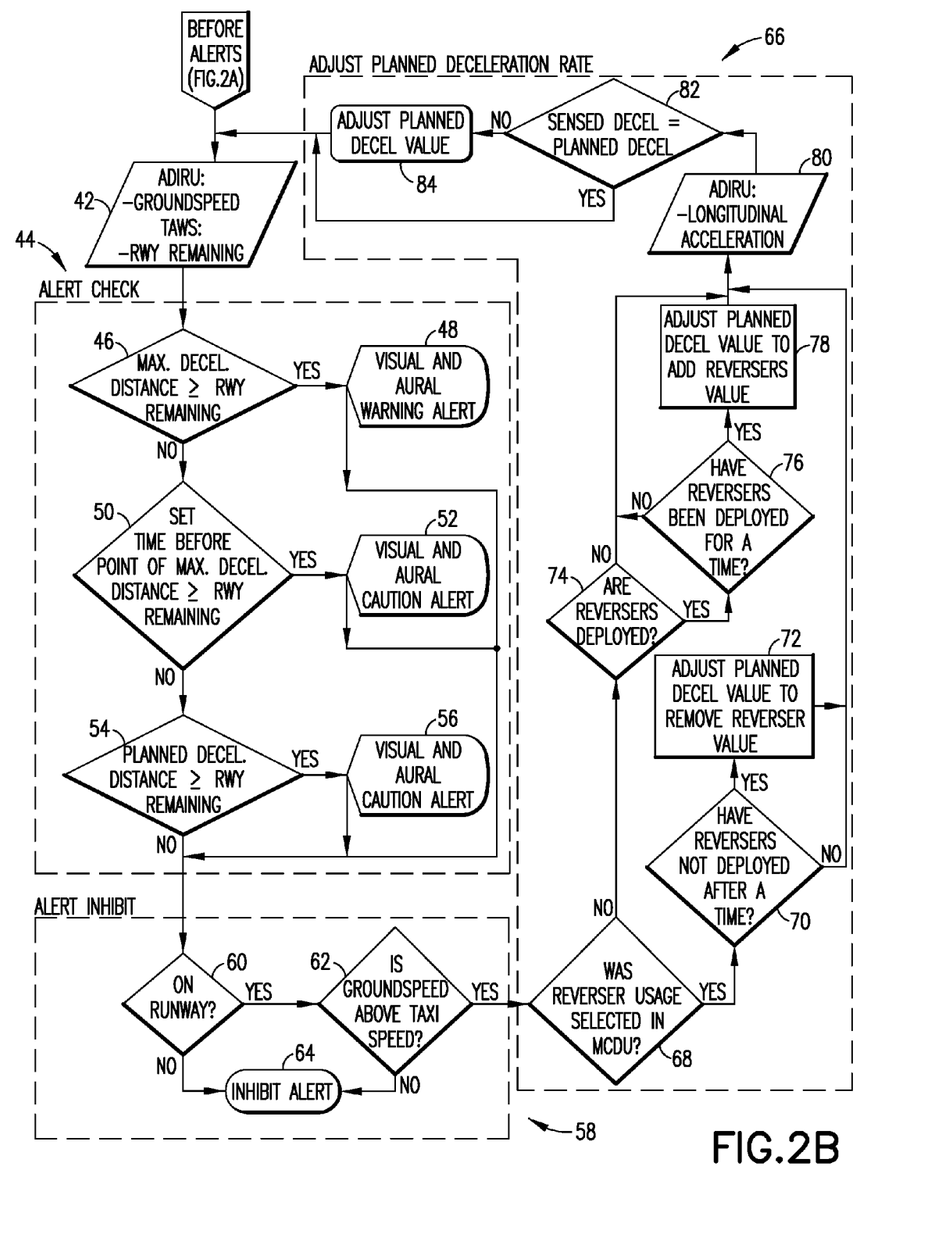

FIGS. 2A and 2B are flowcharts showing logical operations, executed by the computer system, for alerting a pilot when current braking during landing is insufficient to avoid a runway excursion. FIG. 2A shows operations defined by an algorithm for setting an initial planned deceleration rate. FIG. 2B shows operations defined by respective algorithms for checking alerts, inhibiting alerts and adjusting the value of the planned deceleration rate.

Referring first to FIG. 2A, when the airplane has descended to an altitude of, e.g., 450 ft, the computer system starts getting the following information (operations 12) inputs: reverser usage and runway conditions from the flight management system (FMS); and the autobrake setting from a display bus. The computer system is programmed to store this information (in digital format) in random access memory.

The computer system is further programmed to perform a process 10 in accordance with an algorithm for setting a value for the initial planned deceleration rate. Some of the operations performed in process 10 are described in the next three paragraphs with reference to FIGS. 2A and 3.

Before the airplane lands on the runway (indicated by ON GND in FIG. 2A), the computer system determines whether runway conditions and thrust reverser usage have been entered in the MCDU or not (operation 14). If runway conditions and thrust reverser usage are entered in the MCDU, then the planned deceleration rate is set (operation 16) to the deceleration rate that corresponds to the entered runway conditions and thrust reverser usage (if selected). This is accomplished by referencing the aforementioned table (see TAWS 100 in FIG. 1) comprising deceleration rates corresponding to various permutations of runway conditions and thrust reverser states.

If a determination is made in operation 14 that runway conditions and thrust reverser usage are not entered in the MCDU, the computer system then determines (again, before the airplane touches the ground) whether the autobrake is set or not (operation 18). If the runway conditions and thrust reverser usage are not entered in the MCDU (or this input is not available on the airplane) and the autobrake is set, then as soon as the airplane lands on the runway the following operations are performed: (a) any braking alert is delayed (operation 20) for a time to allow for speedbrake deployment and full engagement of the brakes to acquire a sample value of the sensed deceleration rate; (b) the ADIRU longitudinal acceleration is read (operation 22) and adopted as the sensed deceleration rate; and (c) the sensed deceleration rate is then compared to the deceleration rate corresponding to the autobrake-selected runway conditions (i.e., the current setting of the planned deceleration rate) and then the setting of the planned deceleration rate is adjusted in value using autobrake detection logical operations 24.

Figure 3:
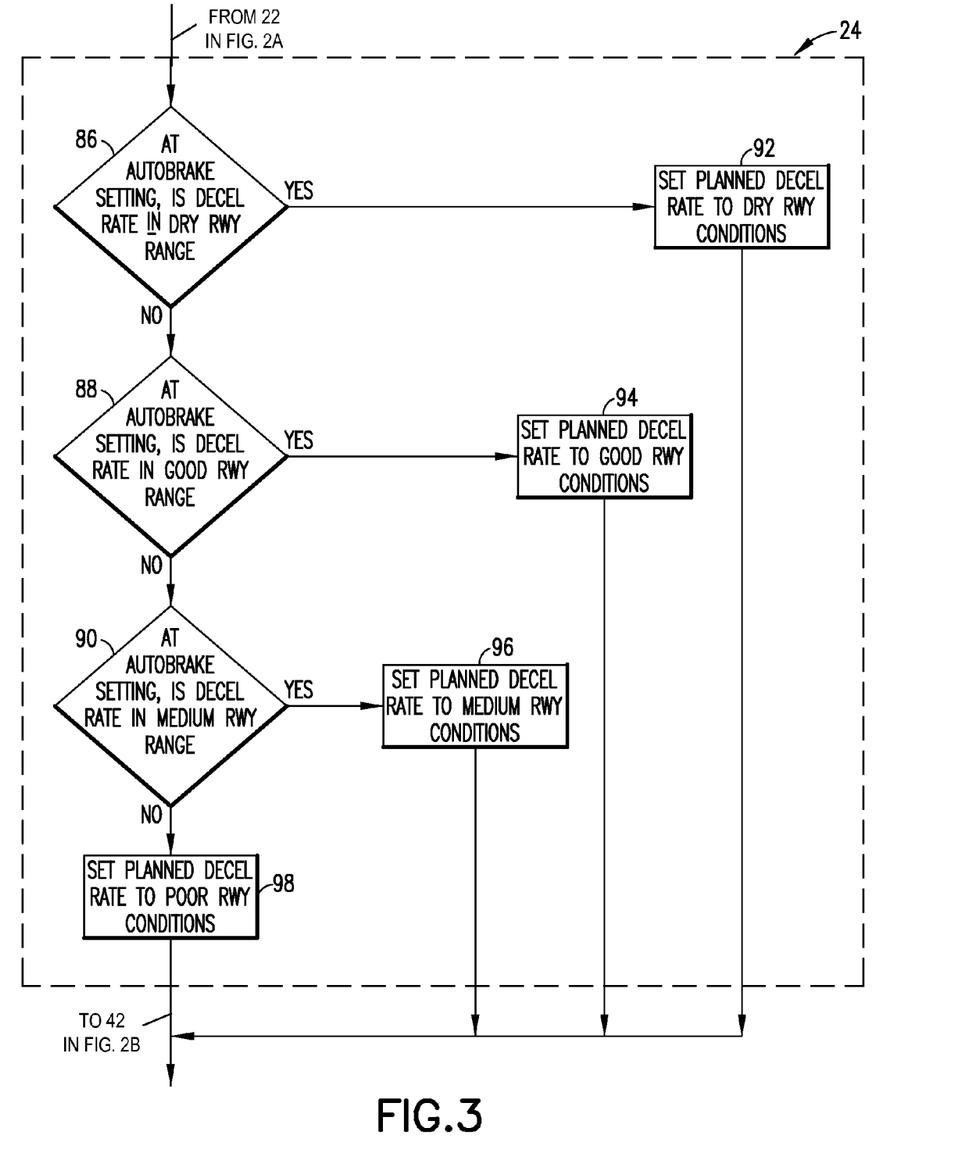
FIG. 3 is a flowchart showing autobrake detection logic employed during execution of operations for setting the value of the initial planned deceleration rate as a function of the deceleration rate corresponding to the autobrake-selected runway conditions.

FIG. 3 shows the autobrake detection logic 24 employed during execution of operations for setting the value of the initial planned deceleration rate as a function of a deceleration rate corresponding to the autobrake-selected runway conditions. The autobrake deceleration rates comprise a respective range of values for each runway condition, which ranges make up an entire range of traction rates divided between dry, good, medium and poor runway conditions. The computer system is programmed to first determine, based on the autobrake setting, whether the sensed deceleration rate falls within the range of deceleration rates corresponding to dry runway conditions or not (operation 86). If the sensed deceleration rate falls within the range of deceleration rates corresponding to dry runway conditions, then the planned deceleration rate is set equal to the lowest deceleration rate in the range corresponding to dry runway conditions (operation 92).

If in operation 86 a determination is made that the sensed deceleration rate does not fall within the range of deceleration rates corresponding to dry runway conditions, then the computer system determines (based on the autobrake setting) whether the sensed deceleration rate falls within the range of deceleration rates corresponding to good runway conditions or not (operation 88). If the sensed deceleration rate falls within the range of deceleration rates corresponding to good runway conditions, then the computer system sets the planned deceleration rate equal to the lowest deceleration rate in the range corresponding to good runway conditions (operation 94).

If in operation 88 a determination is made that the sensed deceleration rate does not fall within the range of deceleration rates corresponding to good runway conditions, then the computer system next determines (based on the autobrake setting) whether the sensed deceleration rate falls within the range of deceleration rates corresponding to medium runway conditions or not (operation 90). If the sensed deceleration rate falls within the range of deceleration rates corresponding to medium runway conditions, then the computer system sets the planned deceleration rate equal to the lowest deceleration rate in the range corresponding to medium runway conditions (operation 96). On the other hand, if in operation 90 the deceleration rate does not fall within the range of deceleration rates corresponding to medium runway conditions, then the planned deceleration rate is set equal to the lowest deceleration rate in the range corresponding to poor runway conditions (operation 98).

Returning to operations 14 and 18 in FIG. 2A, if the runway conditions and thrust reverser usage were not entered in the MCDU (which information is obtained from the FMS) and the autobrake was not set, then before the airplane lands on the runway, the planned deceleration rate is set equal to the lowest deceleration rate in the range corresponding to poor runway conditions (operation 28). When the airplane lands on the ground, the following operations are performed: (1) any braking alerts are delayed for a time (operation 30) to allow for the speedbrake deployment and the brakes to full engage; (2) then alerts undergo an additional delay (either time or distance down the runway) in operation 32 in order to acquire a sample value of the sensed deceleration rate; (c) the ADIRU longitudinal acceleration is then read (operation 34); and (d) the computer system determines whether the sensed deceleration rate is greater than the deceleration rate corresponding to poor runway conditions (operation 36). If the sensed deceleration rate is greater than the deceleration rate corresponding to poor runway conditions, then the planned deceleration rate is set equal to the sensed deceleration rate (operation 38). Conversely, if the sensed deceleration rate is not greater than the deceleration rate corresponding to poor runway conditions, then the planned deceleration rate remains set (block 40 in FIG. 2A) to the poor runway conditions deceleration rate set in operation 28.

After the value of the planned deceleration rate has been set using process 10 shown in FIG. 2A, that value is stored in random access memory and available for use in the alert check process depicted in FIG. 2B. In addition, when the airplane is on the ground, the computer system reads the following inputs (see operations 42 in FIG. 2B): groundspeed information from the ADIRU and remaining runway distance computed by internal processing of GPS location and internal runway data.

The computer system is further programmed to perform an alert check process 44. In a first alert check (operation 46), the computer system determines whether the distance that the aircraft would travel at the maximum manual deceleration rate is greater than or equal to the remaining runway distance or not. The following formula is employed:

$$X_{Current}(DT_{MaxManual}) + \tfrac{1}{2}(DR_{MaxManual})(DT_{MaxManual})^2 \geq RRD$$

where $X_{current}$ is the current groundspeed; RRD is the remaining runway distance; $DR_{MaxManual}$ is the maximum manual deceleration rate; and $DT_{MaxManual}$ is the maximum manual deceleration time:

$$DT_{MaxManual} = (X_{Final} - X_{Current})/DR_{MaxManual}$$

If the distance that the aircraft would travel at the maximum manual deceleration rate for the planned/sensed deceleration rate is greater than or equal to the remaining runway distance, a Warning level alert (visual and aural) is triggered (operation 48).

Conversely, if the distance that the aircraft would travel at the maximum manual deceleration rate for the planned/sensed deceleration rate is less than the remaining runway distance, a Warning level alert is not triggered. Instead a second alert check (operation 50) is executed. In the second alert check, the computer system determines whether the distance that the aircraft would travel during the maximum manual deceleration time plus a specified time interval t (e.g., t=5 or 10 seconds) is greater than or equal to the remaining runway distance or not. The following formula is employed in the second alert check:

$$X_{Current}(DT_{MaxManual}+t) + \tfrac{1}{2}(DR_{MaxManual})(DT_{MaxManual}+t)^2 \geq RRD$$

If the distance that the aircraft would travel during the maximum manual deceleration time plus a specified time interval t is greater than or equal to the remaining runway distance, a Caution level alert (visual and aural) is triggered (operation 52).

If the distance that the aircraft would travel during the maximum manual deceleration time plus a specified time interval t is less than the remaining runway distance, a Caution level alert is not triggered. Instead a third alert check (operation 54) is executed. In the third alert check, the computer system determines whether the distance to reach the final groundspeed $X_{Final}$ of the airplane for the planned/sensed deceleration rate is greater than or equal to the remaining runway distance or not. The following formula is employed in the third alert check:

$$X_{current}(DT) + \tfrac{1}{2}(DR)(DT)^2 > RRD$$

where DR is the planned/sensed deceleration rate; and DT is the deceleration time:

$$DT = (X_{Final} - X_{Current})/DR$$

If the distance that the aircraft would travel during the deceleration time for the planned/sensed deceleration rate is greater than or equal to the remaining runway distance, a Caution level alert (visual and aural) is triggered (operation 56). If the distance that the aircraft would travel during the deceleration time for the planned/sensed deceleration rate is less than the remaining runway distance, a Caution level alert is not triggered.

The computer system is further programmed to perform an alert inhibit process that determines whether the triggered alert should be inhibited or not. In operation 60, a determination is made whether the airplane is still on the runway or not. If it is determined that the airplane is still on the runway and lined up with the runway, then a determination is made in operation 62 whether the airplane groundspeed is above taxi speed or not. If the airplane is on the runway and the groundspeed is above the taxi speed, then the alert is still enabled.

In the alternative, if the airplane is no longer on the runway (see operation 60), or if the airplane is still on the runway but the airplane groundspeed is not above taxi speed (see operation 62), then the alert will be inhibited (operation 64). In the latter case, the computer system will terminate the airplane braking alert process partly depicted in FIGS. 2A and 2B. Situations where the airplane is not on the runway when operation 60 is performed would include if the aircraft did a touch-and-go (went back in the air) or if the aircraft exited the runway at a sufficiently high speed that the airplane never reached its final speed on the runway.

In response to an enable alert command from the computer system, the visual alert display device (e.g., the primary flight display or the navigation) will be activated to display the appropriate visual alert (e.g., the word "BRAKE" in a bright color, optionally in a flashing mode) and the aural warning device will be activated to generate the appropriate audible alert (e.g., a rapidly repeated "BRAKE" announcement).

Still referring to FIG. 2B, the computer system is further programmed so that, after the alert check (operation 44) and the alert inhibit (operation 58), a process 66 is performed in accordance with an algorithm for adjusting (i.e., changing the value of) the planned deceleration rate. First, the computer system checks whether thrust reverser usage was selected on the MCDU page or not (operation 68). (Note: After the airplane has been on the ground for a reasonable amount of time to allow for thrust reverser deployment, the MCDU setting will be ignored and the computer system will proceed to the next logical operation.) If thrust reverser usage was selected, the computer system determines whether the reversers have or have not been deployed after a reasonable time for deployment (operation 70). If the reversers have not been deployed within a specified duration of time, the value of the planned deceleration rate is adjusted to remove the deceleration component attributable to thrust reverser deployment (operation 72). If the reversers were deployed within the specified duration of time, the value of the planned deceleration rate is not adjusted to remove the deceleration component attributable to thrust reverser deployment. The computer system then reads the ADIRU longitudinal acceleration (operation 78).

Returning to operation 68, if thrust reverser usage was not selected, the computer system determines whether the reversers are presently deployed or not (operation 74). If the reversers are deployed, the computer system determines whether the reversers have been deployed long enough to have reached a specified percentage (e.g., 50%) of the maximum reverse thrust (operation 76). If the reversers have been deployed long enough to have reached the specified percentage of maximum reverse thrust, the value of the planned deceleration rate is adjusted to add the deceleration component attributable to thrust reverser deployment (operation 78). After operation 78, the computer system executes operation 80. If the reversers have not been deployed long enough to have reached the specified percentage of maximum reverse thrust, the computer system does not adjust the planned deceleration rate to add the deceleration component attributable to thrust reverser deployment and proceeds directly to operation 80. In the alternative, if the computer system determines in operation 74 that the thrust reversers have not been deployed, the computer system does not determine whether the reversers have been deployed long enough to have reached the specified percentage of maximum reverse thrust adjust the planned deceleration value and instead proceeds directly to operation 80, i.e., reads the ADIRU longitudinal acceleration (also referred to herein as the sensed deceleration rate).

After the ADIRU longitudinal acceleration is read in operation 80, the computer system compares the values of the ADIRU longitudinal acceleration and the planned deceleration rate and determines whether they are equal or not (operation 82). If the computer system determines that the respective values of the ADIRU longitudinal acceleration and planned deceleration rate are equal, the value of the planned deceleration rate is not changed. The computer system then loops back to reading the groundspeed from the ADIRU and the remaining runway distance calculated by internal processing (operation 42), and going through the cycle depicted in FIG. 2B again until alerts are inhibited in operation 64. Alternatively, if the computer system determines that the respective values of the ADIRU longitudinal acceleration and planned deceleration rate are not equal, the value of the planned deceleration rate is adjusted to factor in the sensed longitudinal acceleration value (operation 84). More specifically, the value of the planned deceleration rate will be changed to the value of the sensed deceleration rate provided by the ADIRU. (Optionally, filtering could be employed to remove noise in the system to make the change smoother.) The computer system then loops back to reading the groundspeed and remaining runway distance and going through the cycle depicted in FIG. 2B again until alerts are inhibited in operation 64.

Even after an alert has been issued, the planned deceleration rate is constantly updated because the friction on a runway varies from the start of the runway (also known as threshold) to the end of the runway due to the fact that when airplanes land, they leave rubber deposits on the runway at the touchdown point. As a result the first and last thirds of the runway can actually have less traction than the middle portion of the runway. Also, there could be cases when the water pooling occurs on parts of the runway so when the airplane wheels hit the pool, this event could register as a medium or poor runway condition, but after the wheels exit the pool, the sensed runway conditions would go back to being good to medium.

The braking alerting provided by the above-described system is based on the current performance and runway location of the airplane with braking for the current runway conditions using selected deceleration tools of the airplane (e.g., thrust reversers, autobrake and speedbrakes). The computer system looks at the measured deceleration rate of the airplane during rollout and determines whether that measured deceleration rate will be sufficient, in view of the remaining runway distance, to avoid the airplane going off the end of the runway. If a state of alert is detected, the system issues a visual an/or aural signal alerting the pilot when manual application of additional braking force should be used to slow the airplane.

While an on-ground braking alerting system has been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The method claims set forth hereinafter should not be construed to require that the operations recited therein be performed in alphabetical order (alphabetical ordering in the claims is used solely for the purpose of referencing previously recited operations) or in the order in which they are recited. Nor should they be construed to exclude any portions of two or more operations being performed concurrently.

The invention claimed is:

1. An onboard braking alerting system for an aircraft, the system comprising an alert device operatively coupled to a computer system, wherein said computer system is programmed to perform operations comprising:
   (a) obtaining data representing a position of an end of a runway;
   (b) determining a current position, a current groundspeed and a final groundspeed of an aircraft on the runway, and a maximum manual deceleration rate of the aircraft;
   (c) calculating a remaining runway distance from the current position of the aircraft to the end of the runway;
   (d) calculating a maximum manual deceleration distance that the aircraft would travel during maximum manual braking to the final groundspeed based on the current groundspeed and the maximum manual deceleration rate of the aircraft;
   (e) determining whether the maximum manual deceleration distance calculated in operation (d) is greater than the remaining runway distance calculated in operation (c) or not;
   (f) repeating operations (b) through (f) in response to a determination in operation (e) that the maximum manual deceleration distance is not greater than the remaining runway distance or proceeding to operation (g) in response to a determination in operation (e) that the maximum manual deceleration distance is greater than the remaining runway distance; and
   (g) issuing an alert activation signal,
   wherein said alert device is configured to produce an alert in response to issuance of said alert activation signal by said computer system, and
   wherein said computer system is programmed to perform additional operations if the maximum manual deceleration distance is less than the remaining runway distance, said additional operations comprising:
   (h) calculating a maximum manual deceleration time based on the current and final groundspeed and the maximum manual deceleration rate;
   (i) calculating a distance that the aircraft would travel during a time period equal to the sum of the maximum manual deceleration time and a specified time interval based on the current groundspeed and the maximum manual deceleration rate of the aircraft;
   (j) comparing the distance calculated in operation (i) to the remaining runway distance; and
   (k) issuing an alert activation signal if the distance calculated in operation (i) is greater than the remaining runway distance.

2. The system as recited in claim 1, wherein said computer system is programmed to perform additional operations if the distance calculated in operation (i) is less than the remaining runway distance, said additional operations comprising:
   (l) setting a value for a planned deceleration rate of the aircraft;
   (m) calculating a distance that the aircraft would travel before reaching the final groundspeed based on the current groundspeed and the planned deceleration rate of the aircraft;
   (n) comparing the distance calculated in operation (k) to the remaining runway distance; and (o) issuing an alert activation signal if the distance calculated in operation (m) is greater than the remaining runway distance.

3. The system as recited in claim 2, wherein said computer system is programmed to obtain data representing current runway conditions and thrust reverser usage, wherein the value of the planned deceleration rate is set in operation (l) as a function of said data representing current runway conditions and thrust reverser usage.

4. The system as recited in claim 2, wherein said computer system is programmed to perform additional operations comprising:
   obtaining data indicating that an autobrake onboard the aircraft has been activated;
   obtaining data representing a current deceleration rate of the aircraft; and
   comparing the current deceleration rate to a plurality of ranges of deceleration rates in a table, each range being associated with a respective autobrake setting value and a respective state of runway conditions,
   wherein the value of the planned deceleration rate is set in operation (l) to a lowest value of the one of said ranges of deceleration rates that includes the current deceleration rate.

5. The system as recited in claim 2, wherein said computer system is programmed to adjust the value of the planned deceleration rate of the aircraft in dependence on a state of thrust reversers.

6. An onboard braking alerting system for an aircraft, comprising a computer system and an alert device operatively coupled to said computer system, wherein said computer system is programmed to perform operations comprising:
   (a) obtaining data representing a position of an end of a runway;
   (b) determining a current position, a current groundspeed and a final groundspeed of an aircraft on the runway;
   (c) setting a value for a planned deceleration rate of the aircraft;
   (d) calculating a remaining runway distance from the current position of the aircraft to the end of the runway;
   (e) calculating a distance that the aircraft would travel before reaching the final groundspeed based on the current groundspeed and the planned deceleration rate of the aircraft;
   (f) determining whether the distance calculated in operation (e) is greater than the remaining runway distance calculated in operation (d) or not;
   (g) repeating operations (b) through (g) in response to a determination in operation (f) that the distance calculated in operation (e) is not greater than the remaining runway distance or proceeding to operation (h) in response to a determination in operation (f) that the distance calculated in operation (e) is greater than the remaining runway distance; and
   (h) issuing an alert activation signal,
   wherein said alert device is configured to produce an alert in response to issuance of said alert activation signal by said computer system, said computer system is programmed to obtain data representing current runway conditions and thrust reverser usage, the value of the planned deceleration rate set in operation (c) is a function of said data representing current runway conditions and thrust reverser usage, and said computer system is further programmed to perform the following operations:
   (i) checking whether thrust reverser usage has been selected;
   (j) if thrust reverser usage has been selected, determining whether the reversers have or have not been deployed within a specified duration of time for deployment; and
   (k) if the reversers have not been deployed within the specified duration of time, adjusting the value of the planned deceleration rate to remove a deceleration component attributable to thrust reverser deployment.

7. The system as recited in claim 6, wherein said computer system is programmed to perform the following additional operations:
   obtaining data indicating that an autobrake onboard the aircraft has been activated;
   obtaining data representing a current deceleration rate of the aircraft; and
   comparing the current deceleration rate to a plurality of ranges of deceleration rates in a table, each range being associated with a respective autobrake setting value and a respective state of runway conditions,
   wherein the value of the planned deceleration rate set in operation (c) is a lowest value of the one of said ranges of deceleration rates that includes the current deceleration rate.

8. An onboard braking alerting system for an aircraft, comprising a computer system and an alert device operatively coupled to said computer system, wherein said computer system is programmed to perform operations comprising:
   (a) obtaining data representing a position of an end of a runway;
   (b) determining a current position, a current groundspeed and a final groundspeed of an aircraft on the runway;
   (c) setting a value for a planned deceleration rate of the aircraft;
   (d) calculating a remaining runway distance from the current position of the aircraft to the end of the runway;
   (e) calculating a distance that the aircraft would travel before reaching the final groundspeed based on the current groundspeed and the planned deceleration rate of the aircraft;
   (f) determining whether the distance calculated in operation (e) is greater than the remaining runway distance calculated in operation (d) or not;
   (g) repeating operations (b) through (g) in response to a determination in operation (f) that the distance calculated in operation (e) is not greater than the remaining runway distance or proceeding to operation (h) in response to a determination in operation (f) that the distance calculated in operation (e) is greater than the remaining runway distance; and
   (h) issuing an alert activation signal,
   wherein said alert device is configured to produce an alert in response to issuance of said alert activation signal by said computer system, and said computer system is further programmed to perform the following operations:
   (i) checking whether thrust reverser usage has been selected;
   (j) if thrust reverser usage has not been selected, determining whether the reversers are presently deployed or not;
   (k) if the reversers are deployed, determining whether the reversers have been deployed long enough to have reached a specified percentage of the maximum reverse thrust; and
   (l) if the reversers have been deployed long enough to have reached the specified percentage of maximum reverse thrust, adjusting the value of the planned deceleration rate to add a deceleration component attributable to thrust reverser deployment.

* * * * *